(12) United States Patent
McGlaughlin et al.

(10) Patent No.: US 8,155,995 B1
(45) Date of Patent: Apr. 10, 2012

(54) SYSTEM AND METHOD FOR ASSESSING WEBSITE MARKETING EFFECTIVENESS

(75) Inventors: Flint McGlaughlin, Ponte Vedra Beach, FL (US); Jalali Hartman, Atlantic Beach, FL (US)

(73) Assignee: Digital Trust, Inc., Jacksonville Beach, FL (US)

( * ) Notice: Subject to any disclaimer, the term of this patent is extended or adjusted under 35 U.S.C. 154(b) by 1072 days.

(21) Appl. No.: 11/968,734

(22) Filed: Jan. 3, 2008

Related U.S. Application Data

(60) Provisional application No. 60/883,230, filed on Jan. 3, 2007.

(51) Int. Cl.
*G06F 17/00* (2006.01)
(52) U.S. Cl. ...................................................... 705/7.36
(58) Field of Classification Search .................. 705/7.36
See application file for complete search history.

(56) References Cited

U.S. PATENT DOCUMENTS

| | | | |
|---|---|---|---|
| 7,856,360 B2 * | 12/2010 | Kramer et al. | ................. 705/1.1 |
| 7,890,612 B2 * | 2/2011 | Todd et al. | ..................... 709/220 |

* cited by examiner

*Primary Examiner* — Thomas Dixon
(74) *Attorney, Agent, or Firm* — Allen, Dyer, Doppelt, Milbrath & Gilchrist, P.A.

(57) ABSTRACT

A system and method are provided for assessing an effectiveness of Internet marketing campaigns, and for providing data gathered thereby to subscribers. The assessment data can be gathered in concert with, for example, private sector partners. Different marketing methods are tested, compared, and evaluated for effectiveness in reaching customers. Equations are provided for calculating such values as probability of conversion of a sale and of a success of a marketing campaign, based upon such factors as user anxiety and external motivation. The data can be used to improve a marketing campaign, and also to inform a subscriber base of techniques found to be effective in Internet sales.

24 Claims, 5 Drawing Sheets

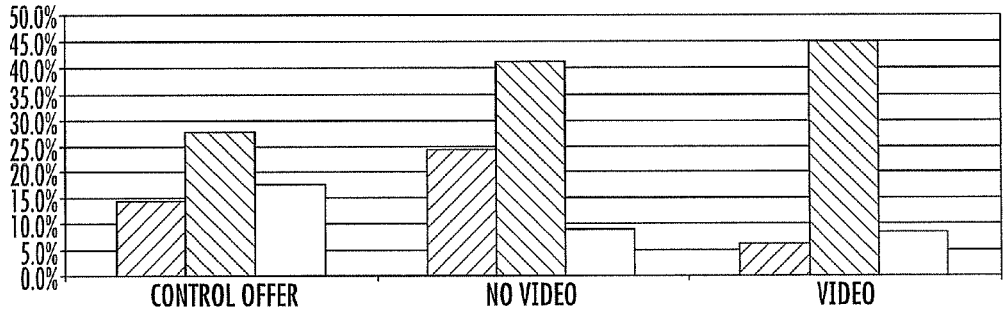
FIG. 7
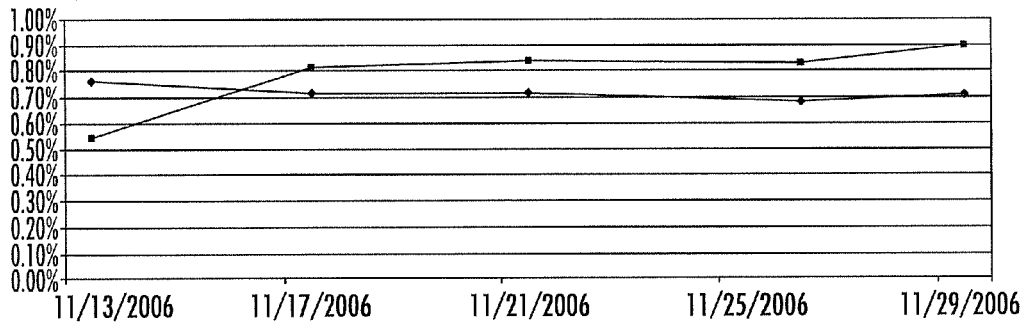
FIG. 8A
FIG. 8B

SYSTEM AND METHOD FOR ASSESSING WEBSITE MARKETING EFFECTIVENESS

CROSS-REFERENCE TO RELATED APPLICATION

This application claims priority to provisional application Ser. No. 60/883,230, filed on Jan. 3, 2007.

BACKGROUND OF THE INVENTION

Field of the Invention

The present invention relates to systems and methods for assessing the effectiveness of an Internet marketing campaign, and to a method of offering data gathered thereby to subscribers.

SUMMARY OF THE INVENTION

The system and method of the present invention are directed to assessing an effectiveness of Internet marketing campaigns, and to providing data gathered thereby to subscribers.

The assessment data can be gathered in concert with, for example, private sector partners. Different marketing methods are tested, compared, and evaluated for effectiveness in reaching customers. Equations are provided for calculating such values as probability of conversion of a sale and of a success of a marketing campaign, based upon such factors as user anxiety and external motivation.

The data can be used to improve a marketing campaign, and also to inform a subscriber base of techniques found to be effective in Internet sales.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

BRIEF DESCRIPTION OF THE DRAWINGS

FIG. 7 illustrates a traffic splitter management screen shot.

FIGS. 8A and 8B illustrate results of a test with three different embodiments of a campaign, with FIG. 8A showing the funnel analysis and FIG. 8B showing conversion rate.

DETAILED DESCRIPTION OF THE PREFERRED EMBODIMENTS

A description of the preferred embodiments of the present invention will now be presented with reference to FIGS. 1-8B.

Figure 1:
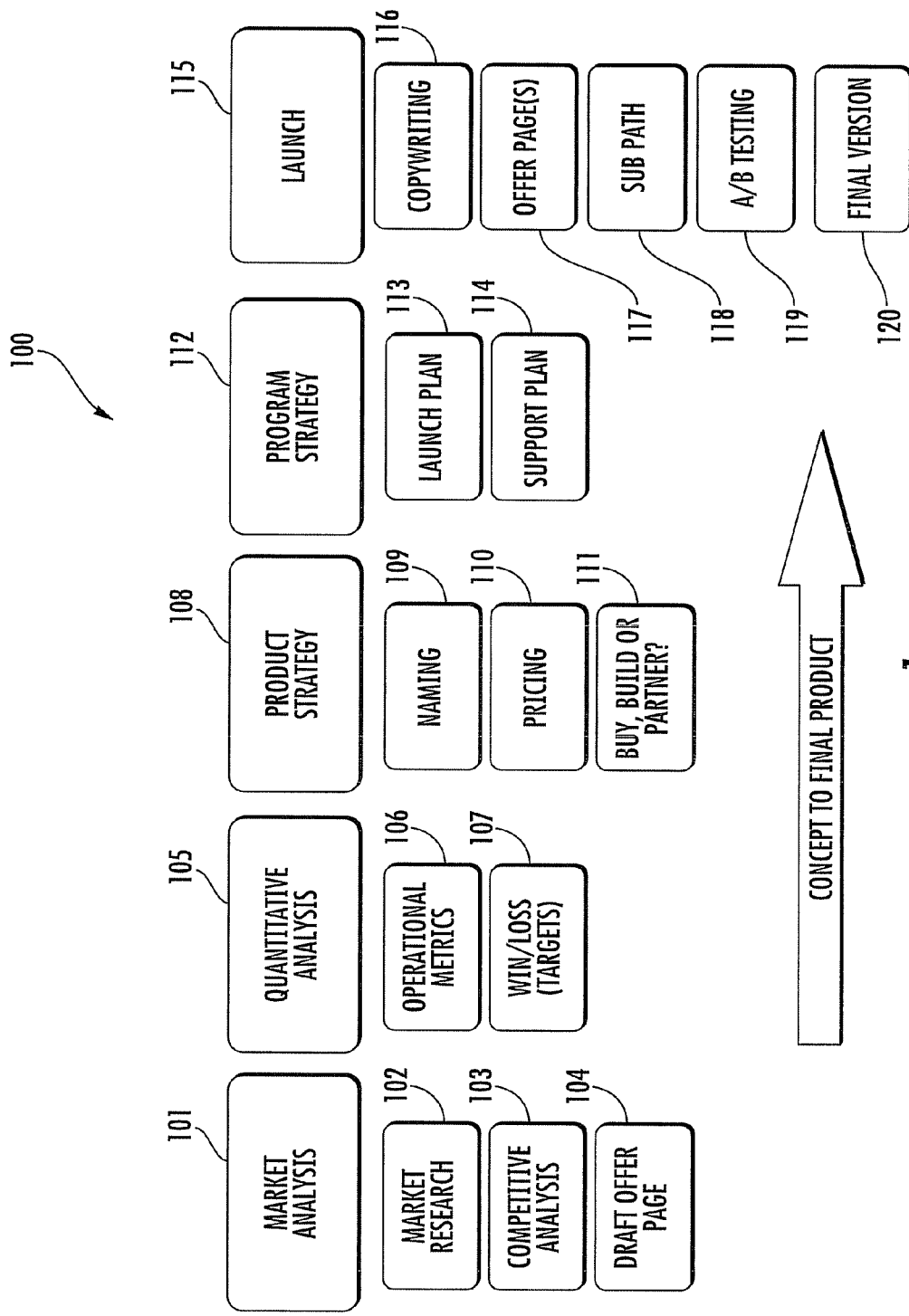
FIG. 1 is a schematic flowchart for the steps in an exemplary product development cycle.

In FIG. 1 are outlined exemplary steps in a product development cycle 100 from concept to final product, which can include market analysis 101, comprising market research 102, competitive analysis 103, and drafting an offer page 104. Quantitative analysis 105 can include calculating operational metrics 106 and win/loss ratios for target consumers 107. Product strategy 108 can include naming 109, pricing 110, and production strategy 111 (buy, build, or partner?). A program strategy 112 is formulated, including a launch plan 113 and a support plan 114. Finally, the launch phase 115 includes copywriting 116, offer page(s) 117, sub-path creation 118, A/B testing 119, and creation of a final version 120.

Figure 2:
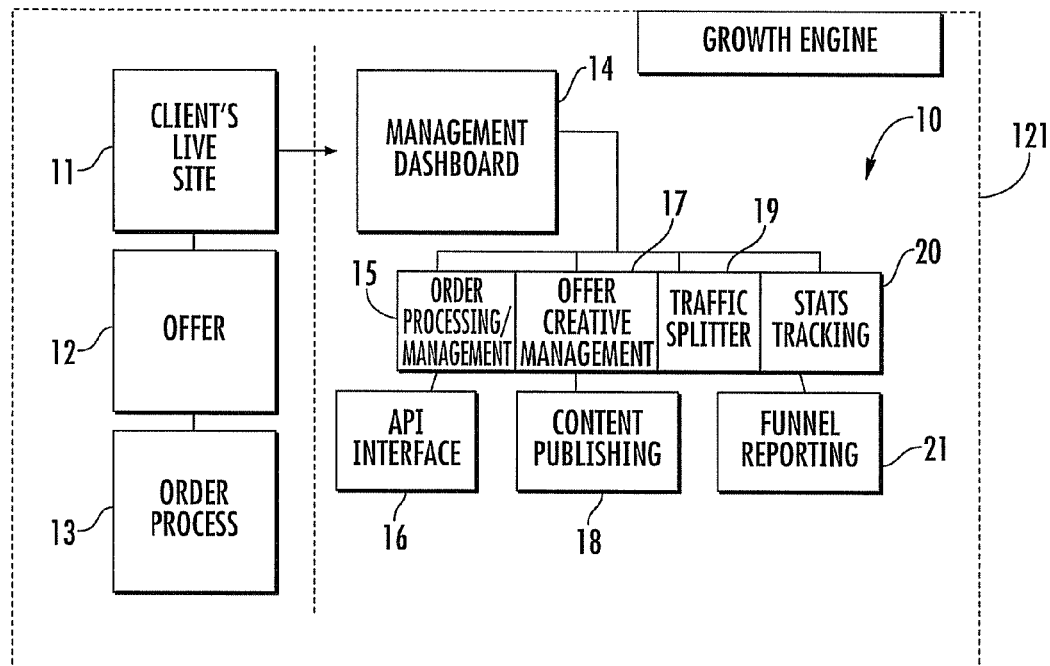
FIG. 2 is a schematic diagram of the growth engine architecture for back-end management.

FIG. 2 is a schematic diagram of the growth engine architecture 121 for back-end management 10. On the client's "live site" 11 an offer 12 can be made and an order can be processed 13. The back-end management side includes a management dashboard 14, which links to order processing and management 15, by means of an application programming interface (API) 16. Offer creative management 17 is connected to content publishing 18. The management dashboard 14 also links to a traffic splitter 19 and statistics tracking 20, which includes funnel reporting 21. The back-end management allows marketers to test multiple marketing creatives, order processes, and lead generation mechanisms and bypass typical technology constraints that are faced by large online e-commerce merchants and publishers. Entire websites can be mirrored, and then content, customers, and orders can be managed, and reports can be generated, giving the marketer flexibility and visibility.

Figure 3:
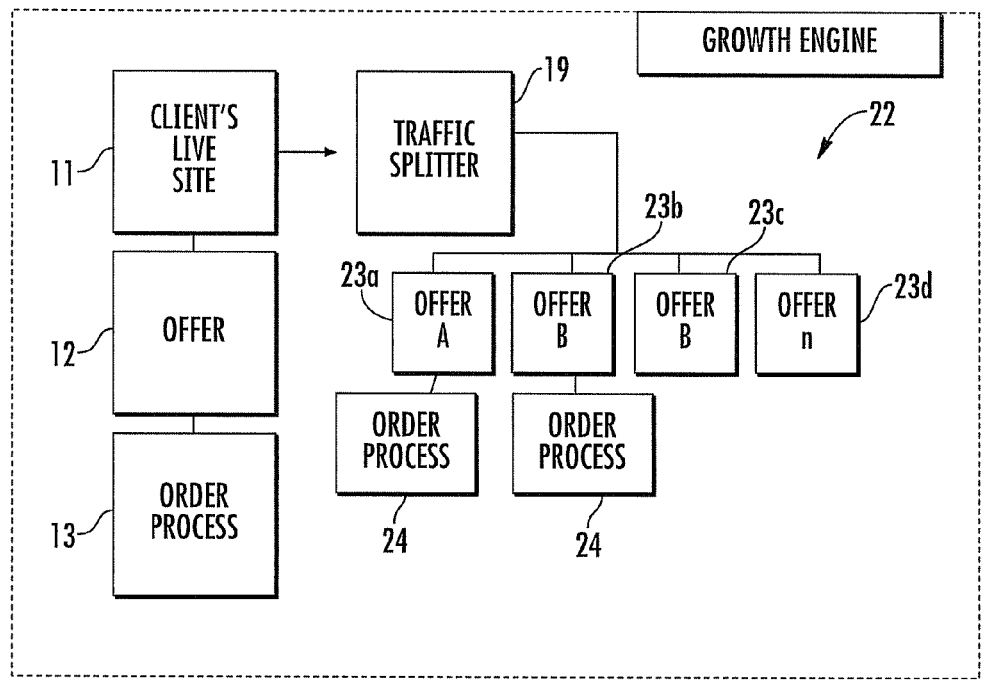
FIG. 3 is a schematic diagram of the growth engine architecture for front-end marketing creative testing.

FIG. 3 is a schematic diagram of the growth engine architecture for front-end marketing creative testing 22. Here the traffic splitter 19 drives to a series of offers 23a-23d, each of which has order processing 24 elements. This testing engine 22 allows marketers to divert portions of web traffic to a new website that can have multiple iterations of content, messaging, design, pricing, and response mechanisms so that testing can be done in real time.

Figure 4:
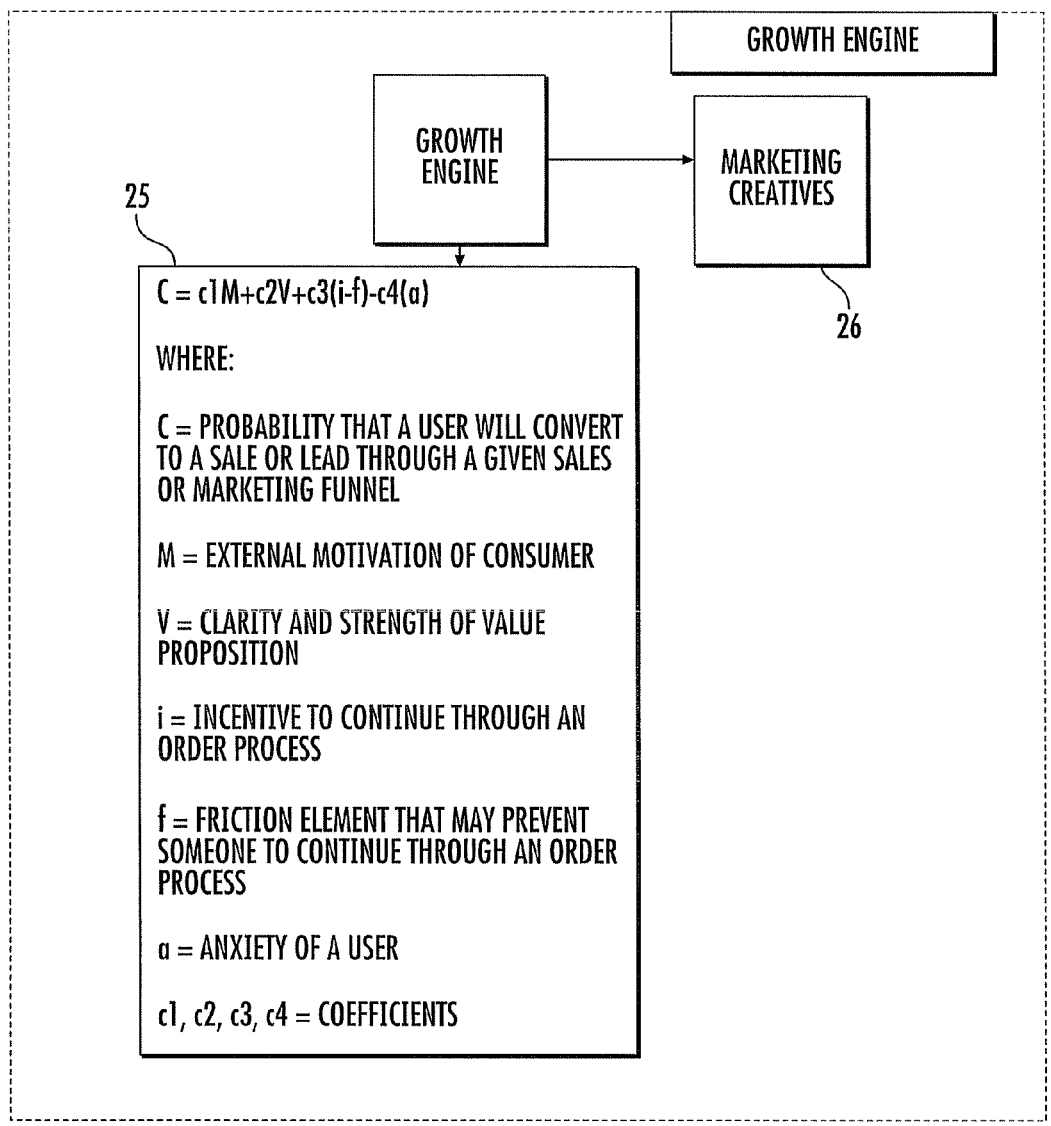
FIG. 4 outlines a growth engine decision algorithm.

FIG. 4 outlines a growth engine decision algorithm 25 that uses a conversion index formula for C to determine what to display to users to achieve the highest probability of completing a registration or order process. The data are used to inform the marketing creatives 26 aspect of the process. The conversion index formula C is:

$$C = c_1 M + c_2 V + c_3(i-f) - c_4(a)$$

where C is the probability that a user will convert to a sale or lead through a given sales or marketing funnel; M is the external motivation of a consumer; V is the clarity and strength of a value proposition; i is the incentive to continue through an order process; f is the friction element that may prevent someone from continuing through an order process; a is the anxiety of a user; and $c_1$, $c_2$, $c_3$, and $c_4$ are coefficients.

Figure 5:
FIG. 5 is a screen shot for the marketing creative manager module.
Figure 6:
FIG. 6 is a screen shot for an orders manager.

FIG. 5 is a screen shot for the marketing creative manager module, listing a plurality of versions of a marketing campaign that are to be tested. FIG. 6 is a screen shot for an orders manager. FIG. 7 illustrates a traffic splitter management screen shot. FIGS. 8A and 8B illustrate results of a test with three different embodiments of a campaign, graphing funnel analysis and conversion rate for each embodiment.

The present invention includes the formulation of equations that can be used to predicting success in a campaign. For example, a probability that a viral campaign will succeed can be formulated as;

$$V_r = 5C(F, P, S, \ldots) + M - f$$

where $V_r$ is a viral ratio; C is contagion; M is the underlying message; f is the friction (mechanism); F is a fun factor; P is a pride factor; and S is a sentimentality factor.

A probability that a business will succeed can be formulated as:

$$S=2v+o+t-r$$

where S is the probability of success; v is the strength and clarity of a value proposition, which equals the natural appeal minus the competitive threat; o is the opportunity for an increase in conversion; t is the amount of untapped cost-effective traffic; and r is a variable.

A product marketing methodology can be formulated as:

$$O_{pr} > O_{prn} > O_{chn}$$

where $O_{pr}$ is product optimization; $O_{prn}$ is presentation optimization; and $O_{chn}$ is channel optimization.

A probability that a direct mail campaign will succeed can be formulated as:

$$D=A+V+M+R$$

where D is a probability of conversion; A is the consumer's attention; V is the force of the value proposition; M is the motivation to take action; and R is the effectiveness of the response funnel.

A micro testing index (M) calculation can be performed as:

$$M=3i+P_m+C_{hn}+2(A/R)$$

where A/R is the testing return on investment, where A is the ability to test, and R represents the resources required to run the test; M is the probability that the test will yield profits; i is the strength of the idea being tested; $P_m$ is the level of optimization of the presentation of the product; and $C_{hn}$ is the ability to drive cost-effective product.

An opportunity assessment can be formulated as:

$$S=2v+o+t-r$$

where v is a force equal to the natural appeal minus the competitive threat; o is the presentation opportunity assessment; and t is the channel opportunity assessment. The natural appeal is initially measured through a reverse search study. For partnerships, one can examine two key components: value proposition and existing channels.

A conversion index calculation can be formulated as:

$$C=4m+3v+l-(f+2a)$$

where C is the probability of conversion; m is the motivation of the user; v is the clarity of the value proposition; i is the incentive to continue; f is the friction; and a is the user anxiety.

Sub-path test elements can be delineated as follows: incentive (bonuses, discounts, and contests), friction (field number, field complexity, field layout, and button design), and anxiety relief (credibility indicators: testimonials, third-party certification, explanatory copy, and contact information).

Click-through rate (CTR) can be calculated as:

$$CTR=int+sn+inc$$

where int is the interest (curiosity, suspense), sn is the specific need (to complete a process), and inc is the incentive to click.

Testing priority can be formulated as:

$$Q=[2(ip)/(it)]-r$$

where Q is the testing sequence, ip is the potential impact, it is the time to impact, and r represents development resources.

In an exemplary marketing test, it was attempted to optimize a landing page. A first objective was to determine whether a small number of specific changes to an offer page would improve overall conversion for a company selling hypnosis products. Multiple variables were tested using the system and method of the present invention using a single factorial "A/B split testing" test design.

The optimized page included improved credibility factors, including a photograph, credentials, and signatures. Greater visibility was given to testimonials, and money-back guarantee was included. An overall improvement rate of 40.7% was observed. Additional improvement (39.0%) was made by removing the photograph from the landing page. Thus it can be seen that the system and method of the present invention can provide data valuable in improving sales for Internet marketing.

In a method of doing business using the present invention, a subscription can be offered to companies, which provides data gleaned from marketing experiments such as outlined above. Subscribers are also offered the opportunity to participate in web clinics on marketing techniques. Further, research partners can be joined with to conduct tests for their particular products/services.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiments thereof, and the advantageous new and useful results obtained thereby, the new and useful constructions, and reasonable mechanical equivalents thereof obvious to those skilled in the art, are set forth in the appended claims.

What is claimed is:

1. A method of assessing an effectiveness of a network-based marketing campaign comprising the steps of:
    establishing a home website on a network, the website linked to a plurality of parallel websites for presenting an offer for a product, the parallel websites different from each other;
    splitting traffic entering the home website among the plurality of parallel product offer websites, the traffic comprising potential customers for the product;
    receiving orders from some of the potential customers for the product;
    tracking statistics on a source of the received orders from among the parallel product offer websites; and
    from the tracked statistics, determining which of the parallel product offer websites has a highest probability of order placement.

2. The method recited in claim 1, wherein the parallel websites differ from each other in at least one of content, messaging, design, pricing, and response mechanisms.

3. The method recited in claim 1, further comprising the step of establishing the parallel websites with the use of a growth engine decision algorithm using a conversion index formula for determining parallel website content to achieve a highest probability of receiving an offer from a potential customer.

4. The method recited in claim 3, wherein the conversion index formula determines the probability that a potential customer will make an order as a function of external motivation, clarity and strength of value proposition, incentive to continue to order, friction element, and anxiety.

5. The method recited in claim 4, wherein the external motivation comprises at least one of a bonus, a discount, and contest; the friction element comprises at least one of field number, field complexity, field layout, and button design; anxiety comprises at least one of credibility indicators, comprising at least one of a testimonial, a third-party certification, explanatory copy, and contact information.

6. The method recited in claim 1, wherein the product offer comprises an offer for a registration.

7. The method recited in claim 1, further comprising the step of predicting a success of the product offer as a function of contagion, underlying message, friction, fun factor, pride factor, and sentimentality factor.

8. The method recited in claim 1, further comprising the step of optimizing a product marketing methodology in a decreasing order of product optimization, presentation optimization, and channel optimization.

9. A method of providing to a company an assessment of an effectiveness of a network-based marketing campaign comprising:
    offering a company a subscription to a marketing-campaign-effectiveness service, the service comprising means for:
    establishing a home website on a network, the website linked to a plurality of parallel websites for presenting an offer for a product, the parallel websites different from each other;
    splitting traffic entering the home website among the plurality of parallel product offer websites, the traffic comprising potential customers for the product;
    receiving orders from some of the potential customers for the product;
    tracking statistics on a source of the received orders from among the parallel product offer websites; and
    from the tracked statistics, determining which of the parallel product offer websites has a highest probability of order placement; and
    reporting to the company results of the determining step.

10. The method recited in claim 9, wherein the parallel websites differ from each other in at least one of content, messaging, design, pricing, and response mechanisms.

11. The method recited in claim 9, further comprising the step of establishing the parallel websites with the use of a growth engine decision algorithm using a conversion index formula for determining parallel website content to achieve a highest probability of receiving an offer from a potential customer.

12. The method recited in claim 11, wherein the conversion index formula determines the probability that a potential customer will make an order as a function of external motivation, clarity and strength of value proposition, incentive to continue to order, friction element, and anxiety.

13. The method recited in claim 12, wherein the external motivation comprises at least one of a bonus, a discount, and contest; the friction element comprises at least one of field number, field complexity, field layout, and button design; anxiety comprises at least one of credibility indicators, comprising at least one of a testimonial, a third-party certification, explanatory copy, and contact information.

14. The method recited in claim 9, wherein the product offer comprises an offer for a registration.

15. The method recited in claim 9, further comprising the step of predicting a success of the product offer as a function of contagion, underlying message, friction, fun factor, pride factor, and sentimentality factor.

16. The method recited in claim 9, further comprising the step of optimizing a product marketing methodology in a decreasing order of product optimization, presentation optimization, and channel optimization.

17. A system for assessing an effectiveness of a network-based marketing campaign comprising:
    a live website receiving traffic comprising potential customers for a product;
    a plurality of offer websites, the offer websites being different from each other and allowing orders to be placed for the product;
    a traffic splitter for dividing traffic from the live website among the plurality of offer websites;
    a back-end management site for processing orders from the plurality of offer websites and tracking statistics on the orders placed for the product from each of the plurality of offer websites, and determining from the tracked statistics which of the plurality of offer websites results in a highest probability of order placement; and
    a display device for displaying the tracked statistics and the determination of which of the plurality of offer websites results in the highest probability of order placement.

18. The system recited in claim 17, wherein the plurality of offer websites differ from each other in at least one of content, messaging, design, pricing, and response mechanisms.

19. The system recited in claim 17, wherein the plurality of offer websites had been established with the use of a growth engine decision algorithm using a conversion index formula for determining offer website content to maximize the probability of receiving an order from a potential customer.

20. The system recited in claim 19, wherein the conversion index formula determines the probability that a potential customer will make an order as a function of external motivation, clarity and strength of value proposition, incentive to continue to order, friction element, and anxiety.

21. The system recited in claim 20, wherein the external motivation comprises at least one of a bonus, a discount, and contest; the friction element comprises at least one of field number, field complexity, field layout, and button design; anxiety comprises at least one of credibility indicators, comprising at least one of a testimonial, a third-party certification, explanatory copy, and contact information.

22. The system recited in claim 17, wherein placing an order comprises accepting an offer for a registration.

23. The system recited in claim 17, wherein the back-end management site further predicts a success of a product offer as a function of contagion, underlying message, friction, fun factor, pride factor, and sentimentality factor.

24. The system recited in claim 17, wherein the back-end management site further optimizes a product marketing methodology in a decreasing order of product optimization, presentation optimization, and channel optimization.

* * * * *